Figure 1:
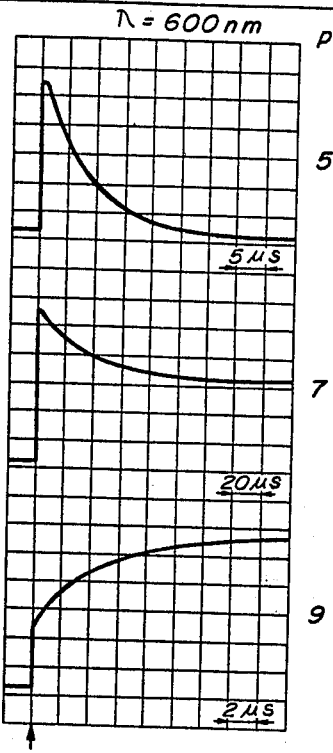

United States Patent [19]

Gratzel et al.

[11] 4,394,293

[45] Jul. 19, 1983

[54] CATALYST FOR THE PHOTOLYTIC PRODUCTION OF HYDROGEN FROM WATER

[75] Inventors: Michael Gratzel; John Kiwi, both of Vaud, Switzerland

[73] Assignee: Engelhard Corporation, Iselin, N.J.

[21] Appl. No.: 184,673

[22] Filed: Sep. 5, 1980

[30] Foreign Application Priority Data

Sep. 8, 1979 [GB] United Kingdom ............... 7931250
Jul. 8, 1980 [CH] Switzerland ..................... 8022338

[51] Int. Cl.³ .................... B01J 31/02; C08K 3/08
[52] U.S. Cl. ..................... 252/430; 252/472; 423/648 R; 423/657
[58] Field of Search ....................... 252/430, 472

[56] References Cited

U.S. PATENT DOCUMENTS

| | | | |
|---|---|---|---|
| 1,222,660 | 4/1917 | Paal .................................. | 252/472 |
| 4,226,742 | 10/1980 | Bearden et al. ................. | 252/472 X |
| 4,244,839 | 1/1981 | Aldridge et al. ................. | 252/472 X |
| 4,248,737 | 2/1981 | Kulporthipanja ............... | 252/430 |
| 4,252,677 | 2/1981 | Smith ............................... | 252/430 |
| 4,259,209 | 3/1981 | Nakane et al. .................. | 252/472 X |
| 4,292,197 | 9/1981 | Chamberlin ..................... | 252/430 X |

*Primary Examiner*—Thomas A. Waltz

[57] ABSTRACT

A catalytic dispersion of fine metal particles mediates the photodissociation of water into hyrogen gas. A protective agent adsorptive to said particles and selected from among homopolymers, copolymers, hydrocarbyl radicals and polysaccharides stabilizes the said dispersion.

12 Claims, 3 Drawing Figures

CATALYST FOR THE PHOTOLYTIC PRODUCTION OF HYDROGEN FROM WATER

This invention relates to an improved catalyst for mediating the photolytic conversion of water into hydrogen gas.

Water and sunlight are abundantly available resources and hydrogen gas is a nonpolluting fuel. Therefore, the discovery of an improved catalyst for converting these resources into hydrogen gas represents a significant advance in the art.

BACKGROUND

The concept of using solar energy to convert water into fuel is an attractive alternative to present day energy sources; however, a lack of technology has made this goal difficult to achieve.

Energy derived from solar radiation cannot always be used directly in a practical manner. Moreover, such energy does not always lend itself to storage for use when sunlight is not available.

Accordingly, much attention has been directed into improving photochemical processes so that the energy generated by such methods can be produced in good yields and stored efficiently.

THE INVENTION

This invention provides a new and improved catalyst capable of forming a stable dispersion in an aqueous medium for mediating the evolution of hydrogen from water by photolysis, said catalyst having a particle size no greater than 500 A diameter and comprising an intimate admixture of one or more Noble metals in finely divided form and a water permeable protective agent adsorptive to said metal. The protective agent is described in detail below. The catalyst is in sufficiently finely divided form such that when it is dispersed in a transparent and colorless aqueous medium, the aqueous medium remains essentially colorless and transparent.

This invention also relates to an improvement on known methods for producing hydrogen gas via the visible light irradiation of aqueous systems capable of absorbing light in the visible range of the spectrum. The invention provides in the photolytic method for producing hydrogen from water by treatment with a reducing species capable of donating electrons to water, the improvement which comprises conducting the reduction step in the presence of a stabilized and finely dispersed catalyst as described above.

The invention also provides a method for preparing a metal catalyst as described above, the method comprising the steps of: (1) adding one or more reducible Noble metal compounds to an aqueous medium to form an aqueous mixture; (2) reducing the Noble metal compounds in the presence of a water permeable protective agent as described in detail below; and (3) separating from the resulting mixture of step (2) particles larger than 500 Å diameter to obtain the catalyst and protective agent in a finely divided state of no greater than 500 A. The separation of step (3) may be achieved by centrifugation or ultra-filtration. The centrifugation is preferably carried out at at least about 20,000 rpm for a period of at least about ten hours.

The subject process improves on known methods for converting water and light energy into a storable fuel by providing a new and improved metal catalyst for use in photolytic processes.

Since water is transparent to visible light a photosensitizer (sensitizer) is used to absorb the incident light and transfer its energy to water molecules through the intervention of an electron relay. The reducing species which is produced by this reaction acts to generate hydrogen from solution.

Specifically, the irradiation of such solutions with visible light results in the molecular excitation of a photosensitizer electron and this excited state of the molecule possesses the ability to reduce water, as protons, to evolve hydrogen.

However, in practice, there is little or no observable evolution of hydrogen from water.

Accordingly, it has been found necessary to utilize catalysts to promote the reduction of water and the evolution of hydrogen.

Applicants have now discovered a new class of stabilized catalysts in a finely dispersed form which mediate the interaction of the reducing species with water and significantly improve the yield of hydrogen gas. The method of preparation for these new catalysts is described hereinafter.

The photolysis process which is mediated by the subject catalysts is examined immediately below so as to better illustrate the point of novelty and the relationship of said catalysts to the overall reaction.

Reaction mechanism: The photolytic production of hydrogen from water requires the irradiation of an aqueous solution by light in the visible region of the spectrum (400–700 nm).

The aqueous solution which is thus irradiated also requires the combined action of a sensitizer (S) for light absorption, an electron acceptor (A) for mediating water reduction and transfer of electrons, an electron donor (D) for regenerating the sensitizer (S) and a stabilized metal catalyst in colloidal form to enhance hydrogen yields:

(1) The sensitizer (S) must absorb visible light energy (400–700 nm) to the extent that it achieves an electronically excited state (S*);

(2) the electron acceptor (A) must be capable of accepting electrons from the excited state sensitizer (S*). The loss of said electrons results in the sensitizer having become oxidized (S+):

(3) the electron donor (D) must be capable of giving up electrons to the oxidized sensitizer (S+); and (4) the colloidal stabilized catalyst must promote electron transfer from the reduced acceptor (A−) to the accepting water protons so as to mediate the evolution of hydrogen gas.

We have discovered that certain stabilized metal catalysts in finely divided form are particularly useful in mediating the reaction (4) between water and the reducing species (A−) to afford relatively high yields of hydrogen.

This class of catalysts is identified by critical parameters which are discussed hereinafter.

The photolysis process will now be examined in greater detail so as to better explain the function of said catalysts and the mechanism by which they promote hydrogen evolution.

1. The irradiation of the sensitizer (S) results in the formation of its excited state (S*) according to the equation:

$$S \xrightarrow{h\nu} S^* \tag{I}$$

This excited state (S*) of the sensitizer molecule (S) exhibits strong reducing properties. Its reduction potential indicates that it should reduce water in the form of hydrogen gas. However, the reduction of water to hydrogen is inhibited by various factors which include decay of the excited state sensitizer (S*) and regeneration of sensitizer starting material (S).

2. Accordingly, an electron acceptor (A) which is capable of being reduced by the excited state sensitizer (S*) and which itself can reduce water, is combined with the excited state sensitizer (S*) to afford the redox couple S+ and A−:

$$S^* + A \rightleftarrows S^+ + A^- \quad (II)$$

This electron transfer from excited state sensitizer (S*) to electron acceptor (A) also results in the oxidative quenching of the excited state sensitizer (S*) and, accordingly, S* is converted to S+.

It is in the following reduction step that the catalysts of this invention are uniquely employed.

The reduction of water to hydrogen via the reducing species A− requires the presence of a catalyst in order to effectively generate the production of hydrogen from solution, resulting, incidentally, in the regeneration of acceptor (A):

$$A^- + H_2O \xrightarrow{Catalyst} \tfrac{1}{2}H_2 + OH^- + A \quad (III)$$

Heretofore, the catalysts used in photolytic processes have not been able to generate hydrogen in appreciable quantities. The subject invention overcomes this obstacle by providing a new class of stabilized metal catalysts in a finely dispersed form which have the effect of increasing significantly the amount of hydrogen generated from aqueous solutions. This aspect of the invention is discussed below.

3. Finally, to complete the photolysis process, the sensitizer (S) should lend itself to regeneration. This regeneration can be achieved by an electron transfer from the donor (D) to the oxidized sensitizer (S+):

$$S^+ + D \rightarrow S + D^+ \quad (IV)$$

For the purposes of this invention the electron donor (D) herein described is a sacrificial species which is irreversibly oxidized in regenerating the sensitizer (S).

To illustrate the nature and scope of this invention there is described below a more detailed analysis of the reaction conditions and reactants needed to effectively generate hydrogen gas by photolytic means.

Sensitizer: A suitable photosensitizer is one which provides a strong absorption of light over an appreciable region of the visible spectrum in aqueous solutions. Moreover, it must be capable of giving up electrons to the electron acceptor (A).

Suitable photosensitizers include, for example, cationic ruthenium and rhodium complexes containing bipyridyl ligands: $Ru(bipy)_3^{+2}$, the rhodium species: $Rh(bipy)_3^{+3}$ or other metal complexes such as $Ru(phen)_3^{+3}$ where "phen" represents ortho-phenanthroline or acridines, phthalocyanines and porphyrines as, for example, water soluble porphorines such as sulfonated zinc porphyrine and the like.

Other photosensitizers include proflavine, acriflavine, $Co(bipy)_2^{2+}$, $Co(bipy)_3^{2+}$, bis- and tris-(bipyridine)iridium complexes such as $[Ir(bipy)_2 H_2O(bipy)sesqui]^{+3}$.

These photosensitizers may be used individually or in combination as mixtures. Moreover, certain compounds such as proflavine may serve both as a photosensitizer and as an electron acceptor.

Acceptor: A suitable acceptor should be reducible by the photosensitizer. Moreover, following the electron transfer the acceptor (A) should have a reduction potential of such magnitude as to be capable, in a thermodynamic sense, of reducing water molecules to hydrogen.

Suitable acceptors include, for example, methylviologen ($MV^{+2}$) of the following structure:

and, various metal cations such as vanadium, europium and titanium cations, that is, $V^{+3}$, $Eu^{+3}$ and $Ti^{+3}$, including the water soluble complexes of said metals such as the salicylate complex. Also included are macrocyclic complexes formed by ions such as $Co^{+2}$ and amino complexes such as cobalt aza crown complexes and quinones.

Donor: The criteria for a suitable electron donor (D) are:

(1) The donor molecule must transfer at least one electron to the oxidized sensitizer (S+) in an efficient manner such that recycling of the sensitizer does not limit the overall rate of hydrogen production; and (2) The oxidized donor species must not react with the reduced acceptor species directly or indirectly at a rate which eliminates or significantly diminishes the hydrogen evolution rate.

Effective donors are, for example, triethanolamine (TEOA), ethylenediaminetetraacetic acid (EDTA) disodium salt, cysteine and the like.

Reaction Conditions

Irradiation: The irradiation of the system was achieved by using a 450 watt lamp as a light source. A 400 nm cut-off filter was placed in the beam to eliminate ultraviolet wave lengths. A 15 cm. water cell absorbed the infrared light.

Laser photolysis experiments were performed with a J.K. 2,000 frequency doubled neodynium laser. The Q-switched pulse typically had a duration of 20 ns and an energy of approximately 100 mJ. All samples were rendered free from oxygen by flushing with helium.

Hydrogen analysis: The instrument used for analysing hydrogen was a Gow-Mac thermal conductivity detector. The analyses were made after separation by chromatography on a Carbosieve 5A column.

Reaction pH: Solution acidity had a decided effect upon the rate of hydrogen evolution. In general, the rate of hydrogen evolution decreased as the medium became either highly acidic or highly basic. Optimum pH levels and the effect of high and low pH ranges is discussed in detail in the "Preferred Embodiments."

Catalyst: The point of novelty in this invention resides in the use of a new and improved metal catalyst in a finely divided form.

We have identified certain critical parameters which determine the chemical nature, form and preparative mode for the subject catalysts as a result of which they are highly effective in intercepting the very fast recombination reactions, that is, the reverse of reaction (II) above, and they produce high hydrogen yields.

We have discovered that the Noble metals and/or their oxides are suitable as catalysts for mediating the hydrogen evolution reaction and intercepting the wasteful reverse redox reaction shown as equation (II) above.

More particularly, we have found that those metals of Group VIII known as the Noble metals, namely, platinum, palladium, ruthenium, rhodium and iridium are effective as catalysts in the subject process.

Most preferred of these Noble metals are palladium and platinum of which platinum is particularly preferred.

Also, we have discovered that the particular mode by which these catalysts are put into a stabilized form augments their superior performance in photocatalytic systems.

Thus, fine dispersions of the said metals in solution and particularly the colloidal form has been found to be particularly effective. Colloidal stabilized platinum metal dispersions are particularly useful and afford the highest order of activity and selectivity in intercepting recombination reactions to afford hydrogen as a product in high yields.

The methods for preparing these colloidal catalysts are described with greater particularity in the Preferred Embodiments.

PREFERRED EMBODIMENTS

Experimental: Because water is transparent to visible light it must be sensitized to accept the visible rays of the sun, whereupon, it should decompose according to the following equation:

$$H_2O \rightarrow H_2 + \tfrac{1}{2}O_2 \qquad (V)$$

Ruthenium tris bipyridyl cation, $Ru(bipy)_3^{+2}$, is a suitable sensitizer (S) for such a decomposition reaction and the following equation illustrates the effect of light absorption on this substance and the resultant electron transfer which occurs:

$$Ru(bipy)_3^{+2} \xrightarrow{h\nu} [Ru(bipy)_3^{+2}]^* \qquad (VI)$$
Ground        Excited
State (S)     State (S*)

where the asterisk indicates the electronically excited state (S*) of said sensitizer. This excited state (S*) can be detected spectroscopically from its decay luminescence at 615 nm. It exhibits strong reducing properties and, theoretically, it should reduce water, as protons to afford hydrogen. However, the continuing luminescence of the sensitizer cation in aqueous solution indicates that the reduction reaction is too slow to compete with the excited state decay. Accordingly, since the ruthenium tris bipyridyl cation (S*) is not able to perform the desired reduction of water to hydrogen the excitation energy of said cation is used to transfer electrons to a suitable electron acceptor (A), such as methylviologen, that is, $MV^{+2}$ (A) according to the following equation:

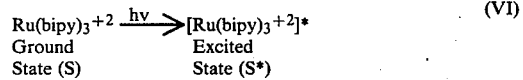

$$[Ru(bipy)_3^{+2}]^* + MV^{+2} \rightleftharpoons MV^+ + Ru(bipy)_3^{+3} \qquad (VII)$$

Confirmation of this electron transfer VII was performed by monitoring the characteristic absorptions of $MV^+$ at 395 and 605 nm, the bleaching of $Ru(bipy)_3^{+2}$ ground state absorption at 452 nm and the luminescence of $[Ru(bipy)_3^{+2}]^*$ at 615 nm. The signal at 605 nm grows concomitantly with the 615 nm luminescence decay indicating that the quenching of excited states leads to the formation of reduced methylviologen ($MV^+$; Equation VII).

The reduced methylviologen radical, $MV^+$ ($A^-$), provides the means by which water is actually reduced to hydrogen:

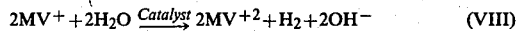

$$2MV^+ + 2H_2O \xrightarrow{Catalyst} 2MV^{+2} + H_2 + 2OH^- \qquad (VIII)$$

This reaction is mediated by the novel metal catalysts of this invention hereinafter described.

A comparison of the reduction potential of the redox couples, $MV^+$ and $Ru(bipy)_3^{+3}$ (Equation (VII)), indicates that said reaction is endoergic by 1.7 eV with respect to the ground state $Ru(bipy)_3^{+2}$. This energy difference provides the driving force for the following reverse-reaction which occurs spontaneously at a high rate:

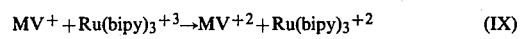

$$MV^+ + Ru(bipy)_3^{+3} \rightarrow MV^{+2} + Ru(bipy)_3^{+2} \qquad (IX)$$

Confirmation of this was shown by the long-time behaviour of the $MV^+$ absorption at 600 nm.

The reverse-reaction (IX) may be prevented by the addition of a donor species (D) which is capable of reducing $Ru(bipy)_3^{+3}$ to $Ru(bipy)_3^{+2}$. This reduction reaction is illustrated by the following equation wherein triethanolamine (TEOA) is the donor species:

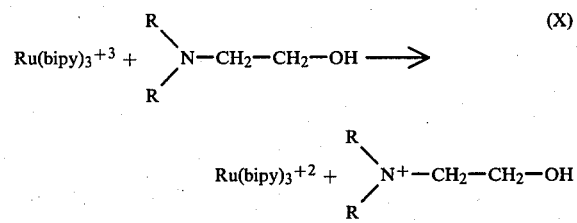

wherein R in both occurrences represents $-CH_2-CH_2-OH$. In reaction (X) the TEOA intercepts the reverse reaction (IX) with a rate constant of $6.5 \times 10^6 M^{-1}S^{-1}$. In the absence of catalytic interception of the reduced acceptor, high concentrations of TEOA have been shown to be necessary for moderately efficient interception and regeneration.

An examination of the reaction between the donor species (D) with oxidized sensitizer, $Ru(bipy)_3^{+3}$, to reform the sensitizer for recycling purposes, indicates that high concentrations of the donor species, relative to the initial sensitizer concentrations, are necessary for effective interception.

The following equations illustrate the mechanism of the subject process together with its intercepting reactions:

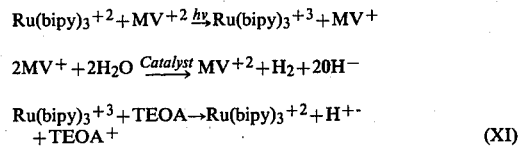

$$Ru(bipy)_3^{+2} + MV^{+2} \xrightarrow{h\nu} Ru(bipy)_3^{+3} + MV^+$$

$$2MV^+ + 2H_2O \xrightarrow{Catalyst} MV^{+2} + H_2 + 2OH^-$$

$$Ru(bipy)_3^{+3} + TEOA \rightarrow Ru(bipy)_3^{+2} + H^{+\cdot} + TEOA^+ \qquad (XI)$$

In this system (XI) the $MV^+$ concentration is critically dependent on both the TEOA concentration and the pH of the solution. The effect of pH on $MV^+$ formation is illustrated in FIG. 1. From the inserted oscilloscope traces it is seen that the 600 nm absorption gradually decays in the microsecond time range until a plateau is attained. This remaining absorption in the absence of oxygen is stable over days giving the solution the characteristic blue color of $MV^+$. Upon admission of air to the solution, the blue color vanishes. The ratio of absorbances obtained in the plateau region to that initially present after the laser pulse, $\lambda = A_p/A_o$, as well as the rate of the fractional decay, increase with TEOA concentration.

The fractional decrease in the $MV^+$ absorption cannot be solely attributed to a simple competition of reactions IX and X, that is, $Ru(bipy)_3^{+3}$ reduction by $MV^+$ and TEOA, respectively, and our experimental evidence indicates that the second oxidant produced in solution, that is, the cation radical $TEOA^+$ is also capable of extracting an electron from $MV^+$:

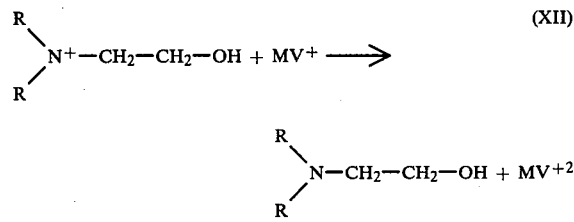

In acid medium, all of the $MV^+$ formed in the photoredox process VII is reoxidized to $MV^{+2}$. A drastic change is noted in alkaline medium.

These observations may be explained in terms of an acid-base equilibrium of the TEOA cation:

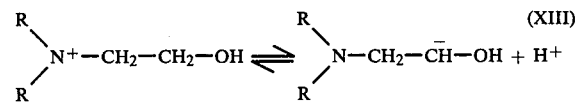

At pH 9 the cation $TEOA^+$ deprotonates to yield a neutral radical with the unpaired electron in α-position to either the amino or alcohol group. Such a species is expected to exhibit reducing instead of oxidizing properties. Hence, after deprotonation of $TEOA^+$, the reoxidation of $MV^+$ can no longer occur. At pH 9, the proton loss seems to be rapid enough to dominate over the competing back electron transfer (XII). Thus, practically all of the $MV^+$ initially produced in the photoredox process remains in the reduced state. The strong reducing properties of the neutral TEOA radical manifests itself also through the fact that it is capable of transferring an electron to $MV^{+2}$:

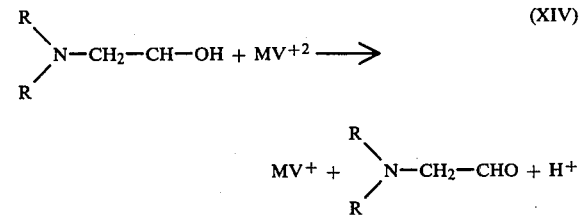

At pH 5, the equilibrium situation seems to favour the protonated form of the radical. As a consequence, the reverse-reaction (XII) can occur. The system is cyclic and no permanent chemical changes are induced by light.

In neutral solution, the protonated and unprotonated radical forms coexist. Here the reactions (X), (XII) and (XIII) occur simultaneously. As a result, only a fraction of the $MV^+$ initially produced can be preserved from reoxidation. As the deprotonation of $TEOA^+$ is a base catalyzed reaction, its rate will depend not only on the pH but also on the concentration of TEOA which itself can act as a proton acceptor. This explains why in FIG. 3 the $MV^+$ decay is enhanced by increasing the TEOA concentration while at the same time the fraction of $MV^+$ which is reoxidized decreases.

When cysteine was substituted for TEOA as an electron donor the reduction of $Ru(bipy)_3^{+3}$ occurred at a rate of $3.7 \times 10^6 M^{-1} S^{-1}$. Analogous to the TEOA system, the deprotonation of the cysteine cation ($Cys\text{-}SH^+ \rightarrow Cys\text{-}S^- + H^+$) also represents the crucial step through which the reverse-reaction of $Cys\text{-}SH^+$ with reduced methylviologen is prevented. Thus, in neutral solution of 0.05 M cysteine 35% of the $MV^+$ escapes from reoxidation while at pH 9, this fraction increases to almost 100%. The equivalent of reaction (XIV), that is, the reduction of $MV^{+2}$ by $Cys\text{-}S^-$ does not occur in this system.

Catalysts

Metal System: We have determined that aqueous dispersions of Noble metals such as the Platinum Group metals or silver and gold, including mixtures thereof, in finely divided form in the presence of a protective agent are eminently suited for mediating the light-induced evolution of hydrogen from water. The Noble metal catalysts in colloidal form are particularly suited for this purpose. Both particle size and the nature of the protective agent affect the rate of hydrogen production.

A wide variety of catalysts were examined including commercially available metals and metal oxide powders as well as novel catalysts prepared according to methods described hereinbelow.

Catalysts comprising metals or metal oxide dispersions of platinum, palladium, ruthenium, rhodium, iridium, osmium, silver, gold and mixtures thereof are active in the system. In particular, stabilized colloidal platinum metal dispersions afforded the highest order of activity and the best selectivity in intercepting recombination reactions thus assuring high yields of hydrogen. The colloidal platinum-polyvinyl alcohol and colloidal palladium-polyvinyl alcohol catalysts were especially effective in affording exceptionally high evolution rates.

Protective Agent

In general, the effectiveness of this catalyst-protective agent combination depends on the type of metal employed and the nature or type of protective agent which is used to maintain said metal in a liquid medium, for example, water, in a dispersed form. A second factor is particle size.

The unit of measure for colloidal particles is the millimicron (mu) or the Angstrom unit (Å), 1 millimicron (mu) being equivalent to 10 Angstrom units.

The size of the particles in a true colloidal dispersion usually vary from about 10–1000 Å in diameter.

In the subject invention the diameter size of the colloidal particles are below 500 Å and, preferably, do not exceed 250 Å; therefore, the particles are in a very finely divided state.

The protective agent of this invention may be colloidal or non-colloidal but colloids are preferred because they assure a more stable and uniform dispersion of metal particles. Applicants do not attempt to fully explain the exact nature of the interaction between catalyst and protective agent, but it appears from our observations that the improvements herein noted are due ostensibly to the manner in which the catalyst and protective agent are combined.

The method for preparing the stabilized metal catalyst consists essentially of (1) adding a reducible Noble metal compound or complex to an aqueous solution to form an aqueous mixture; (2) treating the same mixture with a reducing agent in the presence of a water permeable protective agent adsorptive to said metal; (3) subjecting the mixture of step (2) to a separation procedure such as centrifugation or ultrafiltration to form a dispersion of finely divided metal and; (4) separating the said finely divided metal in its dispersed form from heavier agglomerates.

In practice, the mixture of the protective agent and reducible Noble metal is brought to a pH in the range of from about 2-9 but, preferably, a pH in the range of 5-8 prior to the reduction step. The metal salt insolution is then reduced by treatment with a suitable reducing agent such as hydrogen, hydrazine or sodium formate and the like. The resulting mixture is then subjected to centrifugation or ultra-filtration, etc., so as to separate the dispersion of fine metal particles from the heavier agglomerated metal.

The reaction temperature is not critical but for ease of operation the reaction temperature should generally not exceed 50° C.

The elimination of metal agglomerates by centrifugation provides a supernatant dispersion which contains finely divided metal and protective agent in a stabilized form. This catalytic material is capable of more rapid hydrogen evolution from water solutions than was heretofore possible. By removing the heavy metal particles there is obtained a fine metal dispersion which provides: (1) a constant concentration or source of catalytically active material, (2) the maintenance of greater selectivity in reducing water to hydrogen due to the elimination of less active material which becomes charged and loses its selectivity and, (3) less turbidity. The clarified dispersion is thus less subject to light scattering and exhibits a greater reception of the visible light by the photosensitizer. By maintaining the reducing metal catalyst and protective agent in a finely divided state of no greater than 500 Å the resulting dispersion is more amenable to photodissociation because it more closely mirrors a true solution and thus optimizes the conditions necessary for achieving more rapid generation of hydrogen from solution.

The protective agent should be adsorptive to the metal particles which are utilized as the catalytic agent for the reducing medium and it should be water permeable so as to allow for the intimate contact of the metal particles with the water which is being subjected to photolytic dissociation. The protective agents which meet these conditions may be either colloidal or non-colloidal in nature. However, as stated above, in both instances, the protective agent must show an affinity for the metal particles in solution and it must be water permeable.

On the basis of our observations it appears that the colloid particles are in an intimate relationship with respect to the metal particles and the latter are thus buoyed in solution uniformly in a finely divided state to the same extent as the protective agent itself. Accordingly, there is little or no agglomeration. Instead, the metal particles remain in suspension in a finely divided state and expose a much larger surface area than would otherwise be possible were it not for the distributive effect of the protective agent.

Chemically, the protective agents of this invention may be defined as (1) homopolymers derived from lower acyclic olefins; (2) copolymers obtained by the reaction of a mononuclear lower aralkylidene with a lower acyclic dicarboxylic acid or with a lower alkylene oxide; or (3) hydrocarbons of 10-20 carbon atoms containing at least one polar substituent or (4) polysaccharides such as cellulose, for example, hydroxyalkylcellulose as illustrated by hydroxyethylcellulose.

Specifically, the homopolymers (1) are derived from acyclic olefins of 2-3 carbon atoms which are substituted by hydroxy, carboxy or lower alkyleneoxy radicals, including the esters and amides thereof. Typical homopolymers include, for example, polyvinyl alcohol, polyacrylic acids, polyacrylic acid esters polyacrylic acid amides or polyacrylic acid hydrazides and the like.

Suitable copolymers (2) include the reaction product of an aralkene such as styrene with unsaturated acyclic dicarboxylic acids or with a lower alkylene oxide, preferably, acids of 4-6 carbon atoms such as maleic acid or ethylene oxide and the like.

The hydrocarbons of 10-20 carbon atoms (3) are long chain hydrocarbyl derivatives characterized by the presence of one or more polar groups. A preferred subgroup within this class of compounds are hydrocarbons containing 14-18 carbons and, more preferably, hydrocarbons of 16 carbon atoms containing an ammonium radical, preferably an ammonium halide. Typical hydrocarbons include, for example, alkyl tri-lower alkylammonium halides such as cetyltrimethylammonium chloride or octadecyltrimethylammonium bromide and the like.

Preparation of Catalysts: The following procedures were used to prepare colloidal and non-colloidal platinum dispersions for use as catalysts. The results of a comparative study utilizing said catalysts in the photolytic production of water is set forth in Table 1 below.

Platinum-Polyvinyl Alcohol (Pt-PVA)

Polyvinyl alcohol (M.S.: 60,000; 2% solution/20 ml) was added to 50 mg. of chloroplatinic acid, that is $H_2PtCl_6$. This solution was neutralized with sodium hydroxide to pH 8.0 and then heated to 100° C. for half an hour with agitation. Water was then added to provide a solution having a total volume of 40 cc. Hydrogen gas was then passed through the solution until it became dark gray-brown indicating that platinum deposition had taken place. The pH after reduction becomes slightly acidic.

The mixture was then subjected to centrifugation. By varying time and speed of centrifugation Pt/PVA 60,000 colloid catalysts with different particle size were prepared as shown in Table 1. The supernatant contained lighter particles while the heavier particles were found in the deposit. About 20% of the initial platinum (50,000 g.) is in the supernatant when the centrifugation takes place at 20,000 r.p.m. and the remainder is in the residue.

TABLE 1

| Sample | Concentration mg Pt/25 cc Solution | Diffusion $10^{-7}$ $cm^2/sec$ | $R/h$ Å | Centrifugation time, hours | RPM Centrifugation |
|---|---|---|---|---|---|
| Pt-PVA-60000 | 3.5 | 2.05 | 110 | 10 | 20000 |
| Pt- | 3.5 | 0.73 | 320 | 8 | 13000 |

TABLE 1-continued

| Sample | Concentration mg Pt/25 cc Solution | Diffusion $10^{-7}$ cm$^2$/sec | $R_h$ A | Centrifugation time, hours | RPM Centrifugation |
|---|---|---|---|---|---|
| PVA-60000 Pt-PVA-60000 | 3.5 | 0.67 | 360 | 2 | 13000 |
| Pt-PVA-60000 | 3.5 | 0.45 | 530 | 0 | — |
| PVA-60000 | 0 | 2.10 | 105 | 0 | — |

Note:
$R_h$ represents the hydrodynamic radius of the combined platinum and colloid particles.

Platinum-Polyacrylic Acid Hydrazide

An aqueous solution (50 ml) containing 50 mg of $H_2PtCl_6$ was neutralized to a pH of about 8 by the addition of sodium hydrazide.

The solution was then heated with stirring to 100° C. for about 1 hour.

Upon cooling, 50 ml of a neutral solution containing 4% polyacrylic acid hydrazide was added. Platinum was then precipitated by reducing with hydrogen to afford a colloidal catalyst identified as platinum-polyacrylic acid hydrazide.

By following the procedure of the preceding paragraph but substituting polyvinyl pyrrolidone for the polyacrylic acid hydrazide therein described, there is thus obtained platinum-polyvinyl pyrrolidone.

Platinum-Cetyltrimethylammonium Chloride: This catalyst was prepared by adding cetyltrimethylammonium chloride (84 mg) to an aqueous solution (30 cc) of platinum chloride ($PtCl_3$; 100 mg) at pH 8. The reduction of platinum is carried out by hydrogen until a dark gray color appears. A clear supernatant solution is obtained after one hour of centrifugation at 20,000 r.p.m. The surfactant cetyltrimethylammonium chloride acts as the protective agent for the metallic platinum in photolytic reactions. It is characterized by the presence of both polar and non-polar groups and it is non-colloidal.

Platinum Reduced by Hydrazine Sulfate: An aqueous solution (100 ml) containing 50 mg of hexachloroplatinate ($H_2PtCl_6$) was mixed with an equivalent molar amount of hydrazine sulfate at pH 8. The mixture was stirred and heated at 50° C. for 0.5 hour, after which time the reduction to platinum was found to be complete. There was thus obtained a non-colloidal mixture of platinum in solution.

Platinum (Pt)-Phosphorous, Pt-TiO$_2$ and Pt-Citric Acid:

The catalysts Pt-phosphorous, Pt-TiO$_2$ and Pt-citric acid were prepared by following the procedure described by J. Turkevich, P. C. Stevenson and J. Hillier in the publication Disc. Faraday Soc., Vol. 11; page 55 (1951) but substituting platinum for the gold therein described.

Platinum-Gelatin: (Fluka 180 Bloom) derived from natural protein collagen broken into about 30 amino acids was used at 0.1% concentration as a protective agent according to the method described by R. Zsigmondy, Anal. Chemie, Vol. 40: page 197 (1901). There was thus obtained a Pt-gelatin catalyst.

Figure 2:
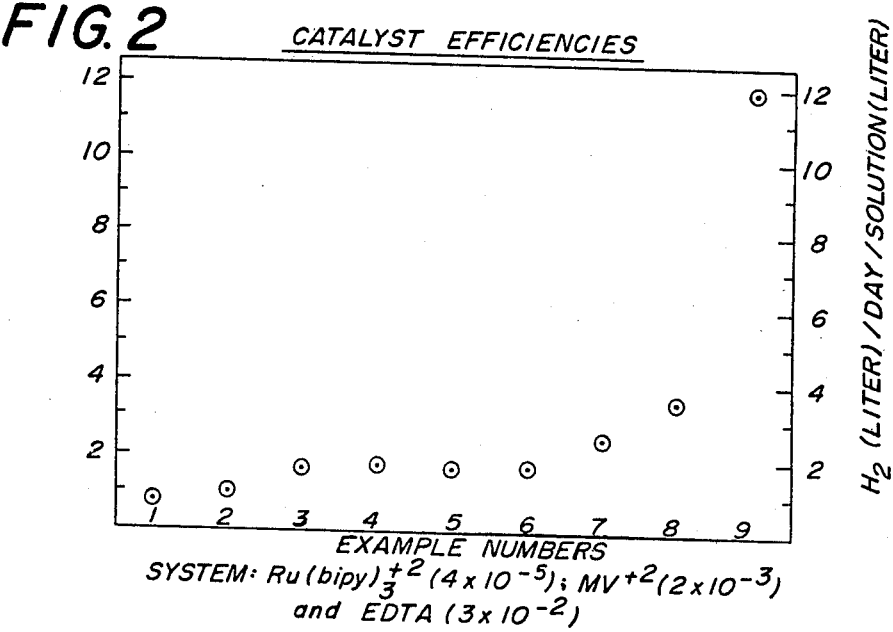

The catalysts prepared according to the above procedures were used to mediate the photolytic evolution of hydrogen and their comparative efficiencies are reported on hereinafter (FIGS. 1 and 2).

Test Procedure: In Test 1 and Test 2 which follow, aqueous solutions sensitized by Ru(bipy)$_3^{+2}$ and containing MV$^{+2}$ acceptor, an EDTA electron donor and a known catalyst, PtO$_2$ (Adams catalyst), were subjected to photolysis to evolve hydrogen in relatively low yields. Test 1 and Test 2 are significant because they describe the photolysis process in terms of a catalyst which is not colloidal in form or otherwise combined with a protective agent as herein defined. In Test 1 the PtO$_2$ catalyst was added subsequent to the irradiation step and in Test 2 the same catalyst was added prior to irradiation.

Test 1: Irradiation and Catalyst Treatment Separately

Irradiation of the neutral solution of Ru(bipy)$_3^{+2}$, $4\times10^{-5}M$; MV$^{+2}$, $2\times10^{-3}$ M with triethanolamine (TEOA) present at approximately 0.05 M produced an intense blue color in the originally orange-yellow solution.

When this irradiated solution was stirred with a few miligrams of platinum oxide (Adams catalyst) under standard conditions at pH 7, the blue color disappeared rapidly and the solution reverted to the original orange-yellow of the sensitizer Ru(bipy)$_3^{+2}$. This cycle can be repeated many times until the TEOA is consumed by oxidation.

Spectral and chromatographic analysis indicates that during the stirring process MV$^+$ is reoxidized to MV$^{+2}$ and water is reduced to hydrogen.

When illumination and agitation with catalyst are carried out simultaneously, continuous production of hydrogen is observed until the TEOA is exhausted or the solution becomes too dark in color for light absorption. The dark color is due to the formation of oxidized TEOA.

Test 2: Irradiation and Catalyst Treatment Simultaneously

In a quantitative experiment, 100 milliliters of an aqueous solution containing $10^{-2}$ M of MV$^{+2}$, $4\times10^{-5}$ M of Ru(bipy)$_3^{+2}$ and 0.05 M of TEOA, 10 mg of platinum oxide (Adams catalyst) was added at pH 7 and the system was irradiated by an Osram XBO-450 watt lamp and agitated by a magnetic stirrer.

During 30 minutes of such treatment a quantity of 0.40 mililiters of hydrogen was evolved by the system. Within this period no depletion of the sensitizer Ru(bipy)$_3^{+2}$ or acceptor (methylviologen; MV$^{+2}$) was detected.

On the other hand, the donor, TEOA, was expended through irreversible oxidation which manifests itself in a gradual darkening of the solution.

The yield of hydrogen was found to depend on the pH of the solution. A pH in the range of from about 6.5–7.5 is suitable. In identical experiments at pH 5 and pH 9, no hydrogen evolution was detected.

Comparative Study: In the examples which follow the comparative efficiency of various other catalysts used in course and colloidal forms is shown. In these examples a continuous photolysis procedure was employed with standard solutions of sensitizer, acceptor and donor in water.

In Examples 1–9 there are reported hydrogen evolution rates obtained using platinum dispersions prepared in the manner described above.

Procedure and Catalyst Types

Examples 1-9: A water solution of ruthenium tris bipyridyl cation [Ru(bipy)$_3^{+2}$; $4\times10^{-5}$ M], methylviologen (MV$^{+2}$; $2\times10^{-5}$ M) and ethylenediaminetetraacetic acid (EDTA; $3\times10^{-2}$ M) was adjusted to pH 5.

The solution was subjected to continuous irradiation using a standard Osram XBO-450 watt lamp after removal of ultraviolet light with a 400 nm filter and after removal of infrared light by a 15 cm. water absorber cell.

To this solution was added, in separate experiments, the nine catalysts described in Examples 1-9, each containing a concentration of 1 mg. platinum:

| Example | Catalyst Tested |
|---------|-----------------|
| 1.      | Pt-Citric Acid |
| 2.      | Pt-Polyvinyl Pyrrolidone |
| 3.      | Pt-Gelatin |
| 4.      | Pt-Titanium Dioxide |
| 5.      | Pt-Phosphorus |
| 6.      | Pt-Reduced by Hydrazine Sulfate |
| 7.      | Pt-Cetyltrimethylammonium Chloride Centrifuged |
| 8.      | Pt-Polyacrylic acid Hydrazide |
| 9.      | Pt-Polyvinyl Alcohol 60,000 Centrifuged |

The experimental results obtained with these catalysts and the concentration levels employed are set forth in FIG. 2.

Catalysts 1 to 6 exhibit very little difference in catalytic effect. Catalysts 7 to 9, on the other hand, provide a significant improvement in hydrogen evolution. The colloidal platinumpolyvinyl alcohol solution (Pt/PVA) identified as catalyst 9 was especially effective in mediating hydrogen evolution and it represents the catalyst of choice in this invention. One factor contributing to the efficacy of the subject catalysts is the centrifugation step which allows for the removal of heavy particles from the solution in the form of a residue. The remaining supernatant is a very finely divided dispersion of metal particles which are maintained in solution more or less uniformly. Accordingly, the concentration of the said catalyst is relatively constant and selective in its reducing properties due to the abasence of large particles. Also, the fine particle size of the catalyst in the supernatant renders it essentially colorless and transparent and, therefore, it is less likely to cause light scattering when subjected to visible light irradiation.

The catalyst 9 of FIG. 2 was prepared by centrifuging a conventional Pt/PVA colloid for 8 hours at 20,000 r.p.m. and by this procedure relatively heavy particles were removed from the mixture. In the transparent supernatant solution there remained about 20% of the initial amount of platinum in a very finely dispersed form.

From these results it is apparent that the choice of stabilizing agent is of considerable importance in selecting the most efficient catalyst preparation procedure to obtain high interception activity.

Also, the dispersity of the catalyst is an important factor controlling the hydrogen evolution rate.

Example 10 below illustrates the effect of catalyst particle size on activity and yield for Pt-PVA stabilized dispersions. Pt/PVA catalysts of different particle size were prepared by varying the time and speed of centrifugation and the parameters of these catalysts are listed in Table 1 above.

EXAMPLE 10

Pt-PVA Catalyst:

In this experiment a 25 ml solution containing $4\times10^{-5}$ M of Ru(bipy)$_3^{+2}$, $2\times10^{-3}$ M of MV$^{+2}$, $3\times10^{-3}$ M of EDTA (disodium salt) was irradiated continuously in the presence of various platinum/PVA catalysts of measured size. In each experiment, the 25 ml of solution contained 1 mg of platinum as Pt/PVA catalyst.

Figure 3:
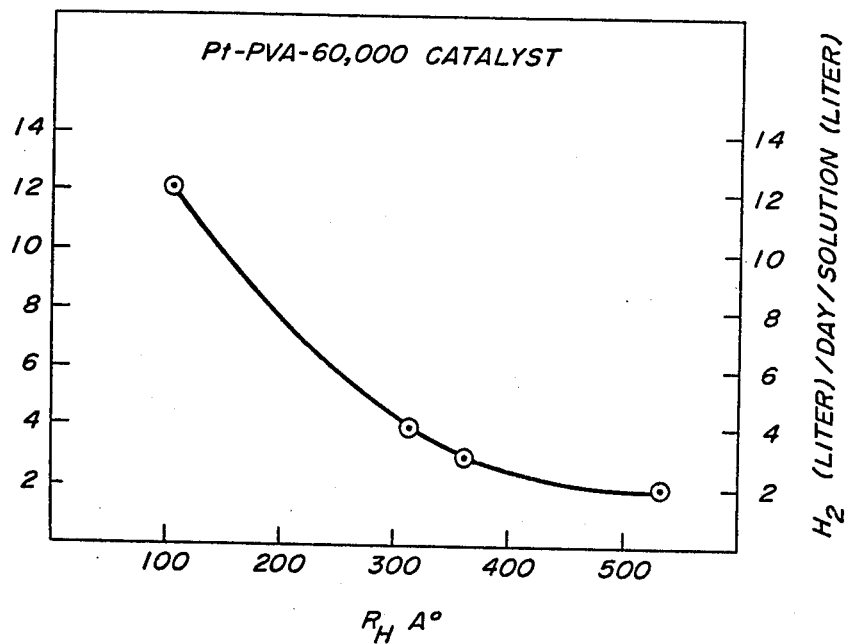

FIG. 3 indicates the hydrogen evolution rates obtained with these catalysts plotted as a function of particle size.

Correlation function measurements to determine the size of the particles were carried out by low angle light scattering on a Chromatix KMX-6 instrument equipped with a 64 channel Digital Correlator.

FIG. 3 indicates that a decrease of the radius from 500 to 100 Å leads to a drastic augmentation of the hydrogen evolution rate which is as high as 12 liters per day per liter of solution for the smallest particle size. In fact, in the last or fourth experiment, the bubbling of hydrogen gas occurring under illumination of the solution was readily visible.

The size effect observed may be explained by the fact that the platinum particles intervene as microelectrodes in the hydrogen evolution reaction (VIII). Electron transfer from MV$^+$ to the platinum particles tunes these microelectrodes cathodically until hydrogen formation can take place. A smaller electrode size is advantageous both from the viewpoint of mass transport of the electroactive species as well as surface area per gram of catalyst employed. It is interesting to note that under our experimental conditions the speed of electron turnover in the MV$^+$/MV$^{+2}$ relay, and not the photon flux or the kinetics of MV$^{+2}$ photoreduction, are rate determining in the hydrogen generation process.

FIG. 3 also shows that a smaller electrode size is advantageous both from the point of view of mass transport of the electroactive species as well as surface area per gram of catalyst employed.

The time and speed of centrifugation differentiates the diverse Pt-PVA-polymers prepared and centrifugation was carried out to extract the supernatant fractions. These fractions are by far the most active catalytically per miligram of platinum. In the case of a Pt-PVA particle size of ~110 Å, the metal polymer particle has equal particle size as the PVA polymer alone indicating that full dispersion of the metal on the polymer has been attained. The PVA polymer is superior in protecting power to similar synthetic polymers such as: polyvinyl acetate, polymethyl methacrylate and polymethyl acrylate as well as gum based catalysts. The centrifuged catalyst is transparent and colorless and relatively stable by comparison to brown colloidal noncentrifuged suspensions of Pt-PVA.

The efficacy of Pt-PVA catalyst in colloidal form is reflected by the fact that the turnover number for Ru(bipy)$_3^{+2}$ $4\times10^{-5}$M based on hydrogen yields of 1 liter hydrogen in 2 hours is 25,000 (See FIG. 3). It compares favorably with a turnover of 25 obtained using PtO$_2$(Pt) in the same system.

The preceding Examples 1-10 illustrate hydrogen generating systems which employ three principal components, namely, a photosensitizer, an electron donor and an electron acceptor combined with a redox catalyst.

The following example illustrates the use of the subject catalysts in a hydrogen generating system of fewer components. In this system proflavine is employed as the photosensitizer, ethylenediaminetetraacetic acid (EDTA) as the electron donor with colloidal platinum polyvinyl alcohol (Pt-PVA) as the catalyst.

EXAMPLE 11

Two Component System; Proflavine Sensitized

An aqueous solution (25 ml) containing proflavine ($2.0 \times 10^{-5}$M), ethylenediaminetetraacetic acid disodium salt ($1.0 \times 10^{-2}$M) and 0.5 ml. of colloidal platinum polyvinyl alcohol solution was buffered to pH 6.0.

The buffered solution was subjected to visible light irradiation ($\pi \geq 400$ nm) using a 450 watt xenon-arc lamp filtered with a water filter and a 400 nm cutoff glass filter.

Hydrogen gas was generated at a rate of about 30 micromoles per hour.

In another study benzophenone was used to photosensitize an isopropanol-water mixture in the presence of finely dispersed colloidal platinum to generate hydrogen gas.

The significance of this study lies in the fact that an identical experiment using conventional platinum sol preparations required the addition of an electron relay such as $V^{+3}$ or $Eu^{+3}$ in order to produce hydrogen. In this system irradiation with light outside the visible light range was used to initiate the process.

By contrast, finely divided platinum-polyvinyl alcohol (Pt-PVA) in colloidal form (M.W.: 60,000; 2% solution) was found to react directly with ketyl radicals produced in situ to selectively produce hydrogen gas.

Described below is the reaction sequence illustrating the photochemical reduction of benzophenone in an isopropanol-water mixture to produce the ketyl radical $(C_6H_5)_2C.$—OH. The said ketyl radicals in turn reduce water directly via a multiple electron transfer involving platinum microelectrodes in solution to produce hydrogen gas:

$(C_6H_5)_2CO \xrightarrow{h\nu} (C_6H_5)_2C=O^*$ $(C_6H_5)_2C=O^* + (CH_3)_2CH-OH \rightarrow (C_6H_5)_2C.-OH + (CH_3)_2C.-OH$

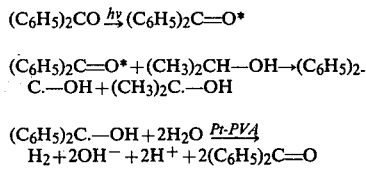

$(C_6H_5)_2C.-OH + 2H_2O \xrightarrow{Pt-PVA} H_2 + 2OH^- + 2H^+ + 2(C_6H_5)_2C=O$ Consistent with this mechanism is the observation that the rate of ketyl radical disappearance increases with platinum concentration.

The following example in which colloidal Pt-PVA catalyst mediates the reduction of water via ketyl radical formation illustrates this process.

EXAMPLE 12

Benzophenone Sensitized System

A solution containing equal parts by volume of benzophenone ($10^{-3}$M) and isopropanol-water ($3 \times 10^{-3}$M) was deoxygenated by passing argon gas through the solution.

Colloidal Pt-PVA was prepared by the precipitation of platinum in colloidal form from an aqueous solution of hexachloroplatinate at pH 8 in the presence of polyvinyl alcohol (MW: 60,000, 2% solution) using hydrogen reduction. Centrifugation of the resulting mixture over 8 hours at 50,000 g. removed the heavier particles as a residue while affording a finely divided Pt-PVA colloid of 120 A° in the supernatant solution.

The supernatant containing colloidal Pt-PVA was added to the benzophenone and isopropanol-water mixture described hereinabove and the system was subjected to continuous illumination with light from an XBO-450 watt xenon lamp which transmits in the 320–380 nm region allowing for selective excitation in the $n\pi^*$ absorption band. The light irradiation was passed through water and an interference filter.

The yield of hydrogen product was $0.9 \pm 0.1$ indicating that the water reduction occurred stoichiometrically. A Gow-Mac thermal conductivity detector with a limit of 0.1 moles was used for hydrogen analysis.

In a repetition of this study using a conventional platinum catalyst in which there was no fine dispersion of platinum particles, essentially no evolution of hydrogen gas was observed. Accordingly, it was necessary to add an electron relay in the form of $V^{+3}$ and/or $Eu^{+3}$ to produce any observable amounts of hydrogen gas.

On the basis of this experiment and the preceding studies the superiority of the subject catalysts in hydrogen-generating photolytic systems is clearly demonstrated.

What is claimed is:

1. A stabilized catalyst for promoting electron transfer to water protons for mediating evolution of hydrogen gas by photolysis comprising an active catalytic reducing amount of Noble metal particles in finely divided form and a water permeable protective agent adsorptive to said metal particles and being polyvinyl alcohol.

2. The catalyst of claim 1 wherein the Noble metal is selected from the group consisting of platinum, palladium, rhodium, ruthenium, iridium, osmium, silver, gold and mixtures thereof.

3. The catalyst of claim 1 wherein the Noble metal is platinum, palladium or a mixture thereof.

4. The catalyst of claim 1 where the Noble metal is platinum.

5. A method for preparing the catalyst of claim 1 having a particle size not greater than 500 Å diameter said method comprising (1) adding one or more reducible Noble metal compounds to an aqueous medium, (2) reducing said Noble metal compounds in the presence of polyvinyl alcohol and (3) separating from the resultant mixtures particles larger than 500 Å diameter to obtain said catalyst.

6. The method of claim 5 wherein the separation of step 3 is achieved by centrifugation or ultra-filtration.

7. The method of claim 5 wherein the separation of step 3 is achieved by centrifugation at at least about 20,000 r.p.m. conducted over a period of not less than about 2 hours.

8. The method of claim 5 wherein the Noble metal compound is selected from the group consisting of platinum, palladium, rhodium, ruthenium, iridium, osmium, silver, gold or mixtures thereof.

9. The method of claim 5 wherein the Noble metal compound is platinum, palladium or a mixture thereof.

10. The method of claim 5 wherein the Noble metal compound is platinum.

11. The method of claim 10 wherein the reducible metal compound is chloroplatinic acid.

12. The method of claim 5 wherein the particle size is not greater than 250 Å.

* * * * *

UNITED STATES PATENT AND TRADEMARK OFFICE
CERTIFICATE OF CORRECTION

PATENT NO. : 4,394,293

DATED : July 19, 1983

INVENTOR(S) : Michael Gratzel and John Kiwi

It is certified that error appears in the above-identified patent and that said Letters Patent are hereby corrected as shown below:

On cover page, under [30] Foreign Application Priority Data, delete [Switzerland] and replace with --United Kingdom--.

Signed and Sealed this

Thirteenth Day of September 1983

[SEAL]

Attest:

GERALD J. MOSSINGHOFF

Attesting Officer       Commissioner of Patents and Trademarks